INVENTOR
CHARLES R. PENQUITE
GEORGE E. BARKER
BY
*Robert J. Schaap*
ATTORNEY

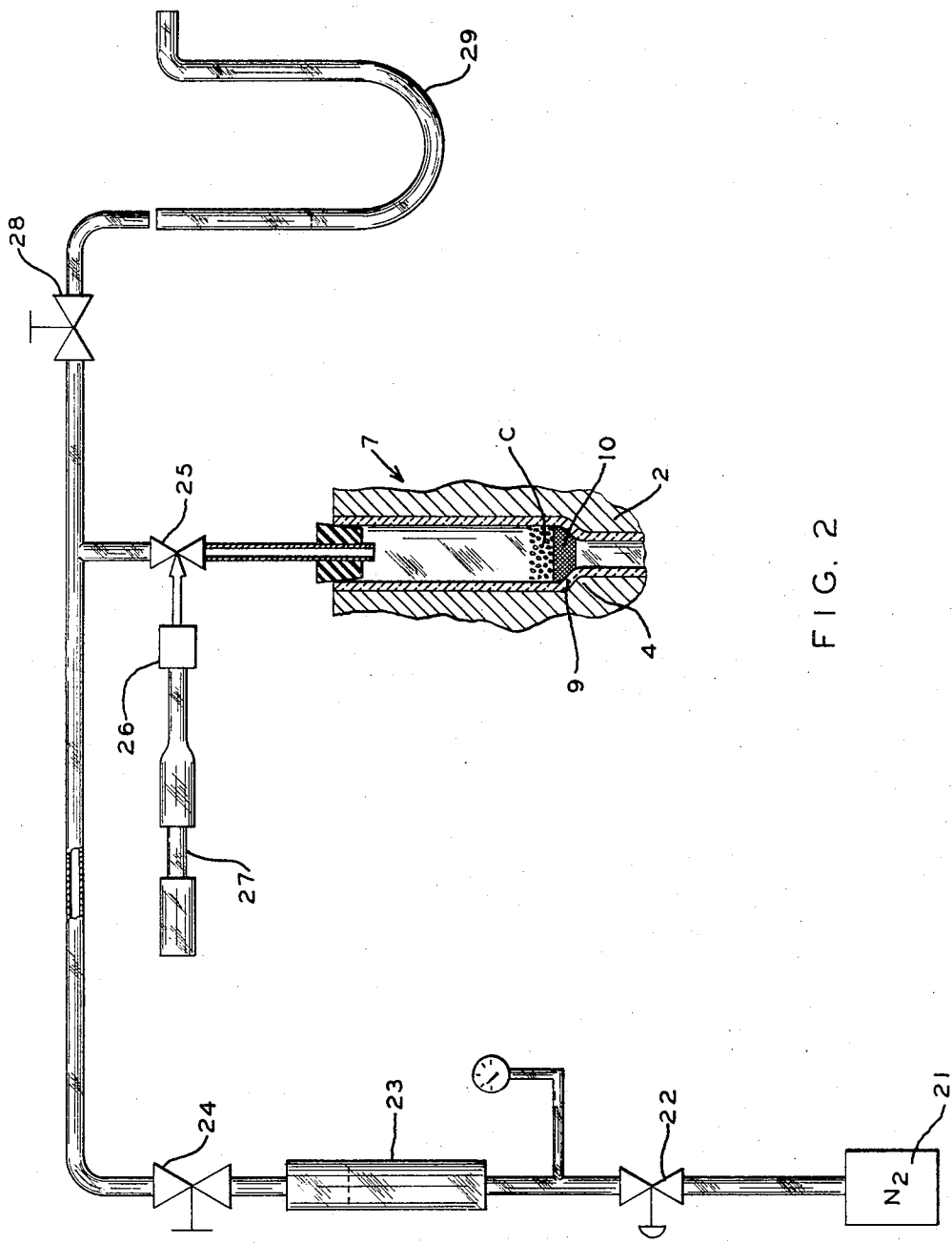

United States Patent Office

3,667,914
Patented June 6, 1972

---

3,667,914
APPARATUS AND PROCESS FOR TESTING
EXHAUST GAS CATALYST SYSTEMS
Charles R. Penquite, Ballwin, and George E. Barker, St.
Louis, Mo., assignors to Monsanto Company, St. Louis,
Mo.
Filed Nov. 3, 1970, Ser. No. 86,549
Int. Cl. G01n 7/00, 9/32
U.S. Cl. 23—230 PC                    22 Claims

ABSTRACT OF THE DISCLOSURE

An apparatus and process for testing catalytic systems used in the treatment of exhausts from hydrocarbon combustion engines. The apparatus comprises a system which includes a reactor system holding a sample tube. The sample tube is provided with a diametrally reduced portion having a glass wool plug therein and the catalyst to be tested is disposed upon this plug. The sample tube is inserted in an electric resistance heater or furnace. A predetermined exhaust gas mixture or mixtures is passed through the catalyst bed at a desired test temperature. Periodically, without removing the catalyst sample from the sample tube, a pressure drop measurement is made across the sample tube in order to determine the degradation of the catalyst bed. The exhaust gas mixtures are passed through the catalyst bed at a predetermined rate designed for laboratory scale equipment. However, when the pressure drop measurement is made, a carefully controlled and precisely reproducible gas flow rate appropriate for measuring catalyst degradation by pressure drop measurement is used.

---

This invention relates in general to certain new and useful improvements in systems for testing and evaluating catalysts used in the treatment of exhausts from hydrocarbon combustion engines, and more particularly, to a system of the type described which employs a measurement of pressure drop across the catalyst bed at preselected temperatures and gas flow rates as a measure of catalyst degradation.

There has long been a need for an effective system to test for activity and degradation resistance of various catalyst systems. In many areas of catalyst employment, such as in catalytic cracking of petroleum products, hydrogenation and dehydrogenation reactions, and the like, the catalyst system is subjected to conditions which may cause a degradation of the catalyst. In many cases, this degradation takes the form of a breakdown of catalyst particles and resultant accumulation of small catalyst particles or "fines." These fines not only impede gas flow, but also severely limit the usefulness of the catalyst.

There have been many reported attempts to study catalyst systems of this type for degradation resistance. One of the major problems resides in the fact that it is desirable to acquire knowledge of degradation over a selected time span. Heretofore, there has been no available technique for evaluating the degradation of a catalyst system which is used under reaction conditions without removing the catalyst from the test reactor. Furthermore, once the catalyst is removed from the test reactor for purposes of evaluating degradation, future test results on this catalyst are not generally consistent with previously acquired data.

In recent years, catalyst systems which are used in the treatment of the exhaust of a hydrocarbon combustion engine, such as an automobile engine, have been receiving widespread interest. This interest is due, in part, to governmental standards which have been enacted for regulating the exhaust from automotive vehicles. The catalyst systems extant are generally designed to oxidize the oxidizable constituents such as carbon monoxide in the exhaust gas and reduce the reducible constituents such as nitrogen oxide which is contained in the exhaust gas.

There has also been some considerable problem in the extant systems used in evaluating the auto exhaust catalysts. One of the most popular systems is to actually insert the catalyst in the exhaust system of an automotive vehicle and operate the vehicle for a required number of miles. Thereafter, the catalyst is removed from the exhaust manifold system of the vehicle and evaluated. This technique is not only time-consuming, but quite costly. Furthermore, with this technique, it is virtually impossible to periodically evaluate the catalyst system over selected periods of time without removing the exhaust manifold system of the vehicle.

There have been other systems employed on a laboratory basis in which the catalyst in the form of a bed, is disposed in a reactor tube. Thereafter, an exhaust gas of the type similar to that created by an automotive vehicle is passed through the catalyst bed. However, these present laboratory techniques require the removal of the catalyst from the test reactor so that the catalyst can be analyzed for degradation. After removing the catalyst from the reactor, it is virtually impossible to continue testing with the same catalyst bed.

It is, therefore, the primary object of the present invention to provide a system for evaluating and testing catalysts kinetically under one set of conditions and perfoming flow measurements across the catalyst under another set of conditions in order to determine attrition of a catalyst without removing the catalyst from a test reactor.

It is another object of the present invention to provide a system for evaluating and testing catalysts used in the treatment of exhaust from a hydrocarbon combustion engine.

It is also an object of the present invention to provide a system of the type stated where testing can be periodically made on a catalyst bed in a reactor tube without disturbing the environment of the catalyst so that further testing of the catalyst may be conducted.

It is a further object of the present invention to provide a system of the type stated which is highly accurate in its operation.

It is an additional object of the present invention to provide a system of the type stated which can be manufactured at a relatively economical cost, which is highly efficient in its operation, and which enables the evaluation of a catalyst in a relatively short period of time.

It is another salient object of the present invention to provide both a method and an apparatus for accelerating the degradation process of a catalyst on a laboratory basis in order to predict degradation resistance in commercial use.

With the above and other objects in view, my invention resides in the novel features of form, construction, arrangement, and combination of parts presently described and pointed out in the claims.

In the accompanying drawings:

FIG. 2 is a schematic side elevational view of another portion of the system for testing catalysts and which covers the apparatus for conducting pressure drop measurements.

GENERAL DESCRIPTION

Figure 1:
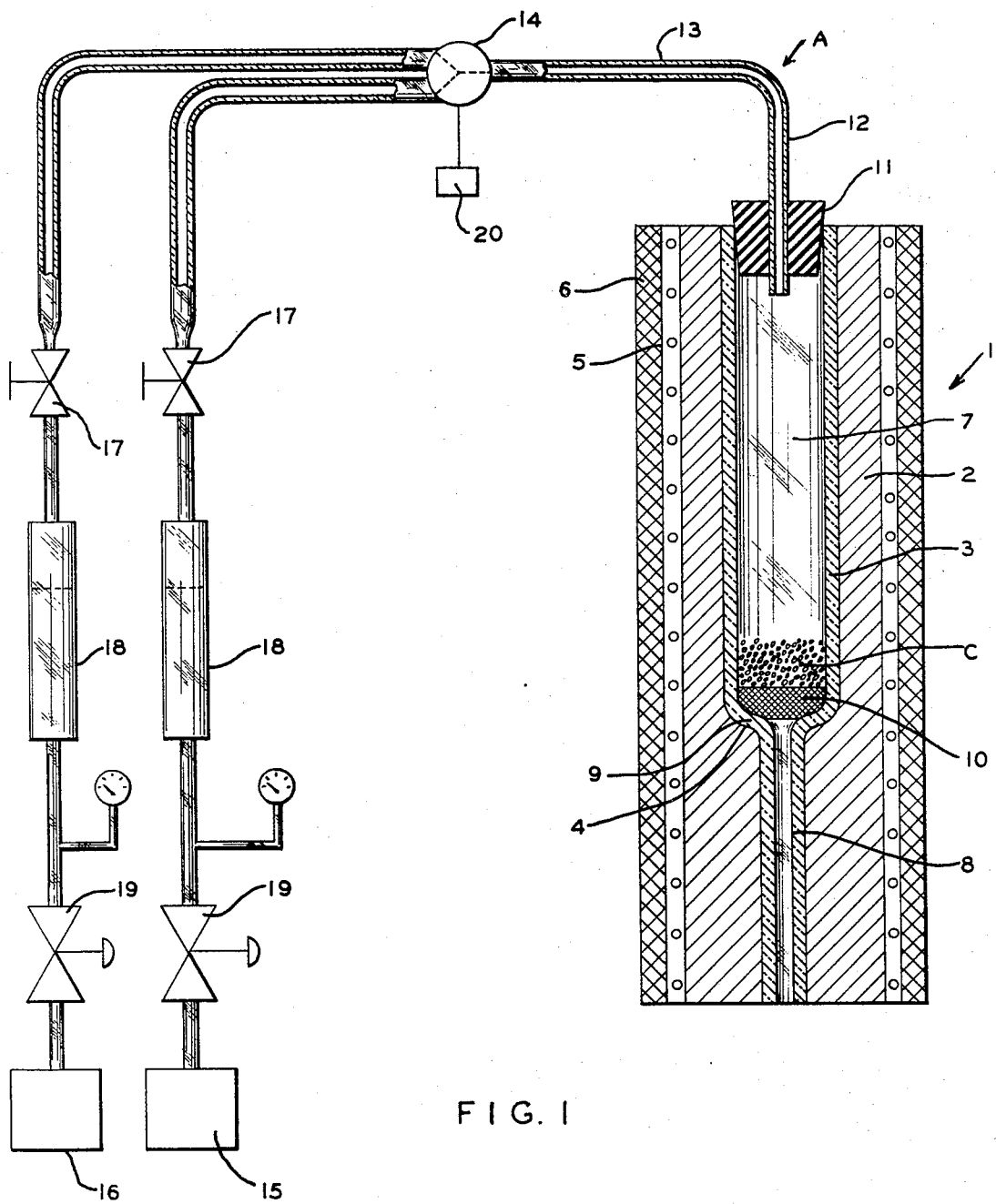
FIG. 1 is a schematic side elevational view of a portion of the system for testing catalysts, and which system is constructed in accordance with and embodies the present invention.

Generally speaking, the present invention resides in a system which employs a reactor tube or so-called "sample tube" disposed within the bore of an aluminum cylindrical block. Surrounding the aluminum cylindrical block are electric resistance heaters connected to a suitable source of electrical current for generating the proper amount of heat which is conducted through the aluminum block to the sample tube. Finally, surrounding the resistance heater is an insulator element. The reactor tube is diametrally reduced at one end in the provision of a supporting shoulder and disposed on the supporting shoulder is a glass wool or quartz wool type plug. A catalyst bed of the proper amount is disposed on this plug. The plug is sufficiently porous in order to permit the passage of a gas through the plug. However, the plug is also of sufficiently tight mesh that catalyst grains resulting from degradation of the catalyst will not pass through the plug. A stopper is inserted in the upper end of the reactor tube and a feed tube is inserted through the stopper into the interior of the reactor tube.

This feeding tube is connected to a control valve which is, in turn, connected to individual gas sources. One of these gas sources rich in oxygen and the other of these gas sources contains a reducing substance. In this manner, it is possible to pass an oxidizing atmosphere into the reaction tube or a reducing atmosphere into the reaction tube. In the actual tests, the valve is controlled so that the oxygen rich gas is passed through the reactor tube for a preselected period of time. Thereafter, the oxygen rare gas is passed through the reactor tube for a preselected period of time. This procedure is continued until it is desired to measure any degradation which occurred within the catalyst bed.

At this point in time, the reactor tube, is removed from the aluminum block, cooled to room temperature, and is then connected to a system for measuring a pressure drop across the catalyst bed. This system employs a source of nitrogen which is regulated by means of a pressure regulating valve, a rotameter, and a needle valve. The pressure regulating valve is set at a preselected pressure read on the pressure gauge. Next, the nitrogen flow is directed through a standard flow resistance and the $N_2$ flow rate is adjusted using the needle flow control valve to obtain a preselected pressure drop on the meriam oil manometer. This procedure enables the precise reproduction of a specific $N_2$ flow rate from time to time.

After precisely calibrating the nitrogen flow, it is directed through the reactor tube and the resulting pressure drop measured across the reactor tube with the meriam oil manometer is a definition of the amount of degradation of the catalyst. This manometer type reading is provided in order to assure that the gas flow rate is maintained at the same level in all tests. The amount of pressure drop which is measured across the catalyst is then a definition of the amount of degradation of the catalyst.

DETAILED DESCRIPTION

Referring now in more detail and by reference characters to the drawings which illustrate a preferred embodiment of the present invention, A designates a system for evaluating and testing catalysts used in the treatment of exhaust gas from a hydrocarbon combustion engine. The system A includes a reactor furnace 1, which comprises an aluminum tube 2 having a central bore 3. The central bore 3 is diametrally reduced at its lower end and is provided with a shoulder 4. Surrounding the aluminum tube 2 is a conventional electric resistance heater 5 which may be in the form of a coil wound about the aluminum block 2. The electric resistance heater 5 is connected to a suitable source of electrical current (not shown). Finally, surrounding the electric heater 5 is a layer of insulating material 6, such as asbestos or the like.

Removably inserted within the bore 3 is a reactor tube or so-called "sample tube" 7 which is preferably formed of Pyrex, quartz, or similar heater resistant material. The sample tube 7 has an overall shape which is similar to the bore 3. The reactor tube 7 is cylindrical in horizontal cross section and at its lower end is tapered and integrally merges into a diametrally reduced discharge tube 8. The discharge tube 8 is, in turn, connected to any suitable discharge source. At the point of the diametrally reduced portion of the reactor tube 7, a shoulder 9 is formed which is disposed upon and supported by the shoulder 4 of the bore 3. In this manner, the reactor tube 7 is rigidly retained within the bore 3 of the furnace 1.

Disposed within the diametrally reduced portion of the reactor tube 7 is a porous plug 10 which may be formed of glass wool, quartz wool, or the like. In place of the plug 10, it is also possible to use a fine mesh screen in the area of 100 mesh for supporting the catalyst bed. On the other hand, a screen supporting a plug-like matrix formed of glass or Pyrex beads has also been found to be effective. Some of the materials which are suitable in the formation of the beads are silica, silicon carbide, mullite, alumina, etc.

A suitable charge of catalyst C is disposed upon the upper surface of the plug 10 in the manner as illustrated in FIG. 1. The catalysts which are used for testing in this system are typically those catalysts which suffer degradation during operation in auto exhaust systems. For example, some of the catalysts employed in the reactor tube 10 are copper oxide catalysts, nickel oxide catalysts, cobalt oxide catalysts, chromium oxide catalysts, manganese oxide catalysts, and a number of others.

Combination catalysts such as copper-manganese and copper-chromia, chromia-manganese, etc. are also capable of being actively tested in the system of the present invention. This system is not limited to the testing of active components alone and is quite readily adaptable for the testing of supported active catalytic components. For example, the system of the present invention is capable of being used with alumina supported copper oxide, alumina supported cobalt oxide, silica supported manganese oxide, silica supported copper oxide, silica supported cobalt oxide, etc. In essence, the present invention is capable of being used with any catalyst composition which suffers degradation on exposure to either oxidizing or reducing atmosphere or combinations thereof.

Disposed within the upper end of the reactor tube 7 is a neoprene type plug 11 which is centrally apertured to accommodate a stainless steel tube 12. The tube 12 is connected through a feed tube 13 to a two-way control valve 14 which is, in turn, connected to a first gas feed source 15 and a second gas feed source 16. Thus, it can be seen that when the valve 14 is in one position, the reactor 7 is connected to the feed source 15, and when the valve 14 is in the other position, the reactor tube 7 is connected to the feed source 16. The valve 14 in each of these systems is connected through a flow control valve 17, a rotameter 18, and a pressure regulator valve 19 to either of the sources 15, 16 in the manner as schematically illustrated in FIG. 1. In this manner, it is possible to maintain the proper flow rate of gas through the valve 14 for each feed gas composition selected to flow through the sample tube 7.

In the actual testing procedure, the gas from the source 15 is first passed through the reactor 7. Thereafter, the gas from the source 16 is passed through the reactor 7 and this action cyclically takes place for a predetermined period of time. The catalyst compositions are loaded in this fixed bed vertical reactor in approximately 3.5 cubic centimeter samples. However, the amount of the charge is predicated on the type of catalyst and the type of test being conducted. The feed compositions are varied automatically with a programmed timer 20 which is connected to the valve 14. This timer 20 is conventional in its construction and is, therefore, neither illustrated nor described in any further detail herein. The two different feed compositions are cycled periodically, typically every 15 minutes. One of these gas sources 15 contains about 1.0 percent carbon monoxide in nitrogen and the other of these gas sources contains about 1% oxygen in nitrogen. It is also possible to use a gas source containing about 5 percent carbon monoxide and about 1.25 percent oxygen. The other of these gas sources 16 contains about 5% carbon monoxide and about 3.75% oxygen. In addition, each of these gas feeds may contain approximately 0.0040 percent halide, bromobenzene being a commonly used source of halide. The feed gas may be preheated before contacting the catalyst bed C. The resistance heater 5 is generally sufficient to heat the gas to the desired temperature as it passes through the reactor tube 7. However, a preheater (not shown) may also be employed as desired. The flow through the reactor tube 7 generally corresponds to a space velocity of about 10,000 hr.$^{-1}$ through the catalyst bed C.

It has been established that this type of procedure produces degradation on catalysts of the type mentioned that are known to degrade in actual road tests and correlates with their relative susceptibility to degradation. The temperature is generally selected for the type of catalyst. For example, the temperature of the inlet gas may range from approximately 100° C. to approximately 600° C. When the catalyst degrades, the material tends to break up into small particles or so-called "fines" which is produced by the aging of the catalyst. These "fines" will tend to collect on the plug 10 and hence interfere with the gas flow through the plug 10. A pressure drop measurement made across the plug 10 is then proportional to the amount of degradation of the catalyst bed C.

The present invention is not only useful in measuring the attrition rate of catalysts, but is also highly effective in accelerating the attrition process on a laboratory basis for predicting degradation resistance in commercial use. By rapid cyclic subjection of the catalyst to alternating oxidation and reduction environments, it has been found that the catalysts will be subjected to degradation action and this degradation action on a laboratory basis is directly correlatable to degradation action in commercial use. In like manner, the apparatus and method of the present invention are useful in measuring the attrition rates of samples produced on a mass production basis. This system has also proved to be highly effective in establishing quality control in the commercial production of catalysts.

By the system of the present invention, it is possible to make a pressure drop measurement across the catalyst bed C and the plug 10 without removing the catalyst sample from the reactor tube 7. A pressure drop measurement system which is more fully illustrated in FIG. 2 is connected to the neoprene plug 11 in the manner as illustrated. The pressure drop system generally comprises a source of nitrogen 21 which is connected through a conventional pressure regulating valve 22 to a rotameter 23. Connected on the other end of the rotameter 23 is a needle valve 24 which is, in turn, connected through a three-way plug valve 25 to the neoprene plug 11 and hence the reactor tube 7. The three-way plug valve 25 has one port connected to a filter 26 which is, in turn, connected to a fixed resistance such as the fixed orifice 27 in the manner as illustrated in FIG. 2. The three-way plug is connected on its upstream side through a valve 28 to a manometer 29.

When it is desired to conduct a pressure drop measurement, the plug 11 is connected to the three-way plug valve 25 in the manner as illustrated in FIG. 2. The pressure regulating valve 22 is open to permit nitrogen from the source 21 to pass through the valve 22 and the rotameter 23. The valve 25 is set to direct the nitrogen flow exclusively through the filter 26 and fixed flow resistance 27. The valve 28 is opened so that a reading on the manometer 29 can be obtained. The rotameter pressure is typically set at approximately 10 pounds per square inch for regulating the nitrogen flow through the fixed resistor 27. The needle flow control valve is adjusted to obtain a selected differential reading in the manometer 29. Typically, a 68.4 centimeter differential reading is used in the manometer 29. The important criterion is that the same differential pressure is used to calibrate the nitrogen flow in each pressure drop measurement. Precise reproduction of the nitrogen flow through the fixed flow resistance is assured by repeating the same differential pressure readings on the manometer 29. Thereafter, the flow is directed through the valve 25 to the reactor tube 7. The differential pressure read on the manometer 29 is used to determine the pressure drop across the sample tube 7. The valve 28 is typically closed during the switching of the valve 25 in order to prevent any surge through the manometer.

In many cases, it is desirable to sample the effluent gas through the discharge tube 8 while a reactive feed is being fed to the catalyst bed. The effluent sample gas is analyzed to determine the catalyst activity which can then be compared to the degradation of the catalyst bed C. Generally, the differential pressure measurement would be made periodically across the catalyst bed in order to provide a representation of the physical attrition of the catalyst bed. It should be observed that it is not necessary to remove the reactor tube 7 from the reactor furnace 1 in order to make this pressure drop measurement. However in this event, the temperature of the calibrated nitrogen flow must be adjusted to precisely the catalyst bed temperature before entering the catalyst bed so that no heating or cooling effects interfere with the differential pressure measurements. Accordingly, after the pressure drop measurement has been made, it is then possible to continue cycling the two gas feeds through the reactor tube 7 for ultimate pressure drop measurements.

The system of measuring the rate and amount of attrition of a catalyst in accordance with the present invention is highly effective in enabling the study of degradation resistivity of a catalyst sequentially over a time span. Furthermore, the measurement of this degradation activity which would be expected in commercial use can be measured on a rapidly accelerated basis by this system. By virtue of the fact that the catalyst bed is never removed from the sample tube 7, it is possible to sample the catalyst by measuring the pressure drop and then reinstituting the reaction, until further sampling or testing is desired.

In passing the exhaust gas through the catalyst bed, the gas velocity is essentially controlled by the reaction conditions. Accordingly, the gas flow rates are determined by the kinetically controlled regime. The space velocity of the gas with respect to the catalyst bed may be an important parameter in attrition of the catalyst over a time range, and generally the gas pressure drop across the catalyst bed would be approximately ½ of an inch of water. However, it is possible to use space velocities so that the gas pressure is approximately 1/1000 of an inch to 1 inch of water.

When the pressure drop measurement is made, the linear gas velocity may be the important parameter for consideration. In this case, the gas flow rate must be sufficiently high in order to obtain a pressure drop measurement across the catalyst bed. In measurement of this pressure drop, the feed gas would normally have a pressure higher by 1½ inches of water to 100" of water or more than the pressure of the gases at the catalyst bed exit. The exact pressure, per se, is not the important consideration, but the ratio of the pressures used in creating the attrition and in measuring the pressure drop may be of prime importance. In many cases, it has been established that the ratio of gas pressure in the pressure drop measurement with respect to gas pressure in creating the attrition should be at least 2.5 and preferably 8.0. While there is no theoretical maximum ratio of gas pressure ratios it has been found that a practical effective maximum ratio is 110 and preferably 85 so that the practical ratios are 2.5 to 110 and preferably 8.0 to 85. It is to be noted that in the extant systems, no variation in the pressure ratio is attained and essentially this ratio is 1.0.

It should also be recognized that when pressure drop measurements are made, the gas velocities are increased to approach the linear gas velocity which would be employed under commercial conditions. In essence, the catalyst is subjected to action resulting in degradation under one set of laboratory conditions and the degradation action is measured kinetically under conditions which approximate a commercial environment. Inasmuch as the catalyst bed is not removed from the sample tube 7, it is therefore, possible to perform the chemical reaction on a continuous steady state basis and to switch over to non-reaction conditions for purposes of measurement.

While the present invention has been described in connection with the measuring of the degradation of catalysts used in the treatment of exhausts from hydrocarbon combustion engines, it should be recognized that the invention is applicable to the testing of a wide variety of catalyst systems. In addition, the present invention is applicable to accelerating the conditions of use of certain catalysts for purposes of studying degradation resistance when the catalysts are subjected to alternating oxidation and reduction cycles. The present invention is useful in the measuring of the degradation resistance of supported noble metal catalyst which are useful in hydrogen, dehydrogenation and reforming reactions and the like where carbon deposits build up on the catalyst bed and are subsequently burned off. The system of the present invention is also useful in measuring the degradation resistance of metal oxide catalysts used in the production of acrylonitrile, for example, metal oxides which can be used in the production of acrylonitrile are bismuth oxide and molybdenum oxide which are employed depletively in a cyclic oxidation-reduction manner.

It should be observed that the gas feeds in the gas sources 15, 16 may vary depending upon the type of catalyst being tested and the conditions for which these catalysts are to be tested. Accordingly, the system of the present invention is not limited to this particular feed gas composition and is not limited to the catalysts thus described.

The system of the present invention has been used in a wide range of tests and has been found to be highly effective in these tests. The following examples adequately describe some of the tests which have been made with the system of the present invention.

This invention is further illustrated by but not limited to the following examples.

EXAMPLE 1

The attrition rate of a catalyst composite including bismuth oxide as an active component on a support was studied by the system of the present invention. The sample tube was formed of Pyrex glass tube with a 15 millimeter diameter and length of 23½ centimeters. The sample tube was diametrially reduced at its lower end to form a discharge portion of 6 millimeters diameter and 12 centimeters length.

A charge of 3.6 centimeters of the aforementioned catalyst was placed on a loosely packed Pyrex glass wool plug located in the sample tube. The glass wool plug was disposed at the base of the 15 millimeter diameter section and supported therein by the construction resulting from the diametrally reduced section.

The aforesaid catalyst was then subjected to continuous oxidation and reduction cycles under the following conditions:

Reducing cycle

Length—10 minutes
Feed composition—100% propylene
Feed rate—approximately 74.5 cc.'s (STP)/min.
Pressure—ambient
Temperature—525° C.

Oxidation cycle

Length—20 minutes
Feed composition—1% $O_2$ in $N_2$
Feed rate—approximately 214 cc.'s (STP)/min.
Pressure—ambient
Temperature—525° C.

Periodically during the aging of the catalyst in the aforesaid manner, the feed gases causing the aging were discontinued and the sample tube was cooled to room temperature. Thereafter, the sample tube was connected to the pressure drop measurement device as illustrated in FIG. 2 of the drawings, in order to measure the pressure dropfi across the catalyst bed. The nitrogen pressure in the rotameter was adjusted to approximately 10 pounds pressure per square inch as indicated by the pressure gauge associated with the rotameter. The three-way plug valve was set to direct the nitrogen flow through the filter and flow resistance and the nitrogen flow was adjusted with needle valve to obtain a differential pressure reading on the manometer of 68.4 centimeters of meriam oil. This differential pressure reading renders a nitrogen flow of approximately 1300 centimeters (STP) per minute. The standard flow resistance resulted from a 1⅜" length of .063 x 0.021 I.D. capillary tubing. The filter consisted of a Hoke SS 40-55 micron filter.

The nitrogen gas flow was next directed through the sample tube and the pressure drop indicated on the manometer was noted. The change in the readings at different points in the catalyst life renders a measure of the catalyst degradation over a period of time.

The results obtained with this test are correlated according to the aging time, the pressure change across the sample tube and the increase of pressure change from the initiation of the test. The following data was obtained.

| Aging time (hours) | Pressure drop across reactor tube | Percent increase in pressure drop |
|---|---|---|
| 186 | 8.7 | 71 |
| 332 | 10.5 | 106 |
| 522 | 13.0 | 155 |
| 691 | 15.4 | 202 |
| 840 | 20.4 | 300 |
| 1,032 | 26.0 | 410 |

The entire aging time consisted of 1032 hours and thereafter the test was terminated. The catalyst was removed from the reactor and gently screened on a 20 mesh screen. The percent of the material (the fines) passing through the screen was determined by carefully collecting and weighing the fines with respect to the initial amount of catalyst. The amount of fines measured 27% by weight with respect to the initial amount of catalyst charge, corresponding to the 410% pressure drop increase, and accordingly, progressive degradation of the catalyst was clearly evident from the pressure data in the above table.

EXAMPLE 2

The procedure of Example 1 was repeated except that a bismuth oxide active component on an alumina support type catalyst was employed. The following test results were obtained.

| Aging time (hours) | Change of pressure across reactor (cm. of Meriam oil) | Percent increase in pressure change |
|---|---|---|
| 0 | 3.4 | |
| 211 | 4.0 | 18 |
| 359 | 5.3 | 56 |
| 548 | 5.7 | 68 |
| 716 | 6.0 | 76 |
| 862 | 6.4 | 88 |
| 1,052 | 6.8 | 100 |
| 1,201 | 7.1 | 109 |
| 1,370 | 7.7 | 126 |
| 1,562 | 7.9 | 132 |

The test was terminated after 1633 hours of aging time. The amount of fines was measured to be approximately 3% which corresponded to the 132 percent increase in pressure drop. Again, the progressive degradation of the catalyst was evident from the pressure drop readings versus time.

It should be understood that changes and modification in the form, construction, arrangement and combination of parts presently described and pointed out may be made and substituted for those herein shown without departing from the nature and principle of our invention.

Having thus described our invention, what we desire to claim and secure by Letters Patent is:

1. A system for testing the physical attrition of degradative catalysts which comprises a sample tube containing a charge of the catalyst, feed means for passing a feed gas causing attrition of the catalyst through the sample tube at a first flow rate, means for maintaining the gas at a desired temperature as it passes through the catalyst charge contained in the sample tube, and means for passing a catalytically non-reactant gas through the catalyst charge at a second flow rate to measure a pressure drop across the catalyst charge in the sample tube and maintaining the second flow rate with respect to the first flow rate at a ratio of at least 2.5.

2. The system of claim 1 further characterized in that the ratio of second flow rate to first flow rate is at least 8.0.

3. The system of claim 1 further characterized in that the ratio of the second flow rate pressure to the first flow rate is within the range of 2.5 to 110.

4. The system of claim 1 further characterized in that the ratio of the second flow rate to the first flow rate is within the range of 8.0 to 85.

5. The system of claim 1 further characterized in that a gas porous support is disposed within the sample tube for retaining the catalyst charge.

6. The system of claim 1 further characterized in that the feed means comprised a first source of a first feed gas composition rich in oxygen and a second feed gas composition poor in oxygen and which feed gas compositions are alternately cycled through the sample tube for predetermined time intervals.

7. The system of claim 1 further characterized in that the means for measuring the pressure drop across the catalyst bed comprises a source of gas under pressure, means for by-passing the sample tube to adjust the flow rate of the test gas to a predetermined level, and means thereafter for introducing the gas at the desired flow rate into the sample tube.

8. The system of claim 1 further characterized in that the system is used in the testing of degradation of exhaust gas catalysts and that the feed gas is an exhaust type gas of the type created by hydrocarbon internal combustion engines.

9. In a system for testing the physical attrition activity of a catalyst composition and which system includes a sample tube for receiving a charge of the catalyst composition and feed gas causing attrition of the catalyst composition is passed through the catalyst composition in the sample tube at a desired pressure; the improvement comprising an apparatus for conducting a pressure drop measurement across the sample tube without removing the catalyst composition from the sample tube and which apparatus includes means for providing a source of catalytically inactive gas under pressure, means for maintaining a proper pressure level of the catalytically inactive gas, means for introducing said catalytically inactive gas under pressure through the sample of catalyst composition, and means for measuring the pressure drop across the sample of catalyst composition.

10. The system of claim 9 further characterized in that the improvement includes a gas porous support disposed within the sample tube for retaining the catalyst composition.

11. The system of claim 9 further characterized in that the system includes a means for alternatingly cycling a first feed gas composition rich in oxygen and a second feed gas composition poor in oxygen through the sample tube.

12. The system of claim 9 further characterized in that the catalyst composition is of the type used in treating the exhaust of hydrocarbon combustion engines and the feed gas to a gas similar to that produced by a hydrocarbon combustion engine.

13. In a system for testing the physical attrition activity of a catalyst composition and which system includes a sample tube for receiving a charge of the catalyst composition, means for passing a feed gas causing attrition of the catalyst composition through the catalyst composition in the sample tube at a first flow rate, means for passing a catalytically inactive gas at a second flow rate through the catalyst composition for measuring a pressure drop across said catalyst composition; the improvement comprising regulating means for maintaining the ratio of the second flow rate with respect to the first flow rate at a ratio of at least 2.5, and means for measuring the pressure drop across the catalyst charge.

14. The system of claim 13 further characterized in that the means for passing the catalytically inactive gas includes a means for alternatingly cycling a feed gas composition rich in oxygen and a feed gas composition poor in oxygen through the sample tube.

15. The system of claim 13 further characterized in that the regulating means maintains a ratio of the second flow rate with respect to the first flow rate of at least 8.0.

16. The method of testing a charge of catalyst of the type used in the treatment of exhaust from hydrocarbon internal combustion engines, said method comprising cyclically passing a combination of oxygen rich and oxygen poor exhaust-type gases through a catalyst charge at a desired temperature to cause attrition of said catalyst charge, adjusting the rate of flow of said gases in accordance with the kinetic reaction conditions existing during attrition of said catalyst charge, and periodically passing a catalytically inactive gas through the catalyst charge at a linear flow rate which is substantially higher than the rate of flow of the exhaust-type gases, and measuring a pressure drop across the catalyst charge during the passing of the neutral gas through said charge.

17. The method of claim 16 further characterized in that a first fed gas rich in oxygen and a second feed gas poor in oxygen are alternately cycled through the sample tube for predetermined time intervals.

18. The method of claim 16 further characterized in that an increase in pressure drop measured in a time interval span is proportional to the degradation of the catalyst charge.

19. The method of claim 16 further characterized in that the linear flow rate of the catalytically inactive gas approximates that in commercial use.

20. The method of claim 16 further characterized in that the ratio of the flow rates of the catalytically inactive gases to the exhaust type gases is at least 2.5.

21. The method of testing a charge of catalyst for degradation resistance on an accelerated basis, said method comprising cyclically passing a first feed gas composition rich in oxygen and a second feed gas composition poor in oxygen with respect to said first feed gas through a charge of said catalyst charge maintaining each of said feed gases at a desired temperature when passing through said charge of catalyst, and periodically passing a catalytically inactive gas through the catalyst charge, measuring a pressure drop across the catalyst charge during the passing of the catalytically unreactive gas through said charge, and correlating the degradation of the catalyst on the accelerated basis to the expected degradation of the catalyst on an unaccelerated basis.

22. The method of claim 21 further characterized in that the catalyst is of the type used in the treatment of exhaust from a hydrocarbon internal combustion engine, and the first and second feed gas compositions are exhaust type gases.

References Cited

UNITED STATES PATENTS

| | | | |
|---|---|---|---|
| 1,959,242 | 5/1934 | Kennedy | 23—255 |
| 2,658,819 | 11/1953 | Formwalt | 23—253 |

MORRIS O. WOLK, Primary Examiner

R. E. SERWIN, Assistant Examiner

U.S. Cl. X.R.

23—232 R, 253 PC, 254 R; 73—196